US008627379B2

(12) United States Patent
Kokenos et al.

(10) Patent No.: US 8,627,379 B2
(45) Date of Patent: Jan. 7, 2014

(54) OFFERING ITEMS IDENTIFIED IN A MEDIA STREAM

(75) Inventors: Danae M. Kokenos, Seattle, WA (US); Matthew T. Tavis, Seattle, WA (US); Charles Porter Schermerhorn, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 892 days.

(21) Appl. No.: 12/683,737

(22) Filed: Jan. 7, 2010

(65) Prior Publication Data

US 2011/0167456 A1    Jul. 7, 2011

(51) Int. Cl.
H04N 5/445    (2011.01)

(52) U.S. Cl.
USPC .................. 725/60; 725/34; 725/48; 725/51

(58) Field of Classification Search
USPC .............................................. 725/32–36, 60
See application file for complete search history.

(56) References Cited

U.S. PATENT DOCUMENTS

| 5,249,044 | A | 9/1993 | Von Kohorn |
| 5,880,769 | A | 3/1999 | Nemirofsky et al. |
| 5,978,013 | A | 11/1999 | Jones et al. |
| 6,282,713 | B1 | 8/2001 | Kitsukawa et al. |
| 7,231,651 | B2 | 6/2007 | Pong |
| 7,577,979 | B2 | 8/2009 | Feinleib et al. |
| 7,856,644 | B2 | 12/2010 | Nicholson et al. |
| 2002/0120935 | A1 | 8/2002 | Huber et al. |
| 2004/0249726 | A1* | 12/2004 | Linehan .......................... 705/26 |
| 2006/0150218 | A1 | 7/2006 | Lazar et al. |
| 2007/0039020 | A1 | 2/2007 | Cansler, Jr. et al. |
| 2007/0061845 | A1 | 3/2007 | Barnes, Jr. |
| 2007/0150360 | A1 | 6/2007 | Getz |
| 2008/0052226 | A1 | 2/2008 | Agarwal et al. |
| 2008/0304747 | A1 | 12/2008 | Marinkovich et al. |
| 2010/0060802 | A1* | 3/2010 | Huegel .......................... 348/734 |
| 2010/0175080 | A1* | 7/2010 | Yuen et al. ..................... 725/32 |
| 2011/0093884 | A1 | 4/2011 | Wachtfogel et al. |
| 2011/0225604 | A1 | 9/2011 | Bova |

OTHER PUBLICATIONS

U.S. Appl. No. 12/732,963, filed Mar. 26, 2010, Kokenos, "Identifying Items in a Content Stream".
Ad-ID Advertising Identification and Management, Advertising Digital Identification, LLC, Copyright 2002-2003, Retrieved on Feb. 24, 2010 at <<https://www.ad-id.org/>> and <<https://www.ad-id.org/help/help_detailNEW.cfm>>, 2 pgs.
Google Googles Labs, Retrieved on Feb. 24, 2010 at <<http://www.google.com/mobile/goggles/#landmark>>, 1 pg.

(Continued)

*Primary Examiner* — Pankaj Kumar
*Assistant Examiner* — Timothy Newlin
(74) *Attorney, Agent, or Firm* — Lee & Hayes, PLLC

(57) ABSTRACT

Disclosed herein are techniques to enable users to purchase or receive information regarding items identified in a stream output by a content output device, regardless of whether the users are previously associated with the content output device or a device that monitors the stream. With these techniques, for instance, a user watching a video stream displayed on a television may see an advertisement for an item offered for purchase. In response, the user may choose to initiate a purchase of the item from an item offering service, to add the item to a shopping cart of the user at the item offering service, or to receive information regarding the item from the item offering service.

28 Claims, 10 Drawing Sheets

(56) References Cited

OTHER PUBLICATIONS

OpenCable, CableLabs, Retrieved on Feb. 24, 2010 at http://www.cablelabs.com/opencable/, 1 pg.

Non-Final Office Action for U.S. Appl. No. 12/732,963, mailed on Apr. 30, 2012, Danae M. Kokenos et al., "Identifying Items in a Content Stream", 11 pages.

The EP Search Report mailed Mar. 14, 2011 for PCT Application No. PCT/US10/61984, a counterpart application of U.S. Appl. No. 12/683,737.

The Extended European Search Report mailed Jul. 9, 2013 for European patent application No. 10842750.1, 6 pages.

Office action for U.S. Appl. No. 12/732,963, mailed on Nov. 9, 2012, Kokenos, "Identifying Items in a Content Stream", 12 pages.

* cited by examiner

OFFERING ITEMS IDENTIFIED IN A MEDIA STREAM

RELATED APPLICATIONS

This application is related to U.S. Provisional Application No. 60/823,611, filed on Aug. 25, 2006, and U.S. patent application Ser. No. 11/548,111, filed on Oct. 10, 2006, both entitled UTILIZING PHRASE TOKENS IN TRANSACTIONS and both incorporated herein by reference.

BACKGROUND

While watching a video stream such as broadcast television, users view scores of advertisements for an array of different products offered for sale by an array of different merchants. However, if one of these users desires to purchase an offered product, the user must typically either go to a brick-and-mortar store that offers the desired product or use a computer that is entirely disconnected from the television to order the desired product over the Internet. For instance, after watching an advertisement for a particular pair of shoes, the user may either travel to a local merchant that offers the shoes or may order the shoes from a merchant using a desktop or laptop computer of the user. However, both of these two options require the user to direct his or her attention away from the object currently of interest—namely the television stream that is currently being broadcasted to the television of the user.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
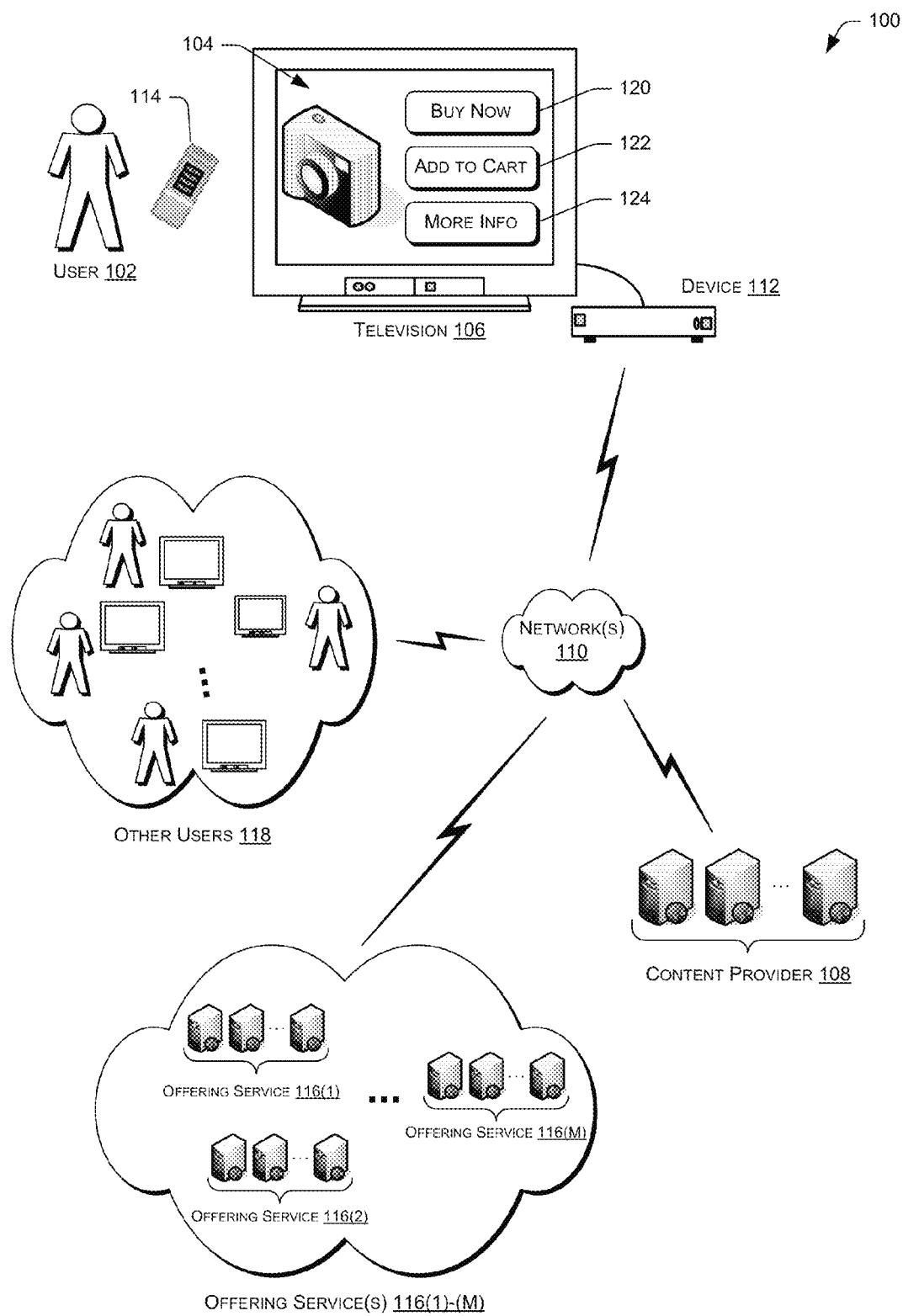
FIG. 1 illustrates an example architecture that includes a user watching a video stream on a television. As illustrated, the television couples to a device that monitors the video stream displayed on the television. Within this architecture, the user may, for example, request to purchase or receive information regarding an item displayed on the television, regardless of whether the device or the television has been previously associated with the user making the request.

This disclosure is directed, in part, to techniques to enable users take advantage of offers identified within a media stream. For instance, the techniques may allow the users to obtain (e.g., purchase, rent, lease, download, etc.) items or receive information regarding items identified in media stream being output by a content output device. The content output device may comprise a personal computing device, a television, a radio, a heads up display, a kiosk or any other device capable of outputting any sort of content. In addition, the stream output by the content output device may comprise a video stream, an audio stream or any other form of media stream. These techniques apply regardless of whether the users are previously associated with the content output device or with a device that monitors the stream output by the content output device.

With these techniques, in one example, a user watching a video stream displayed on a television may see an advertisement for an item offered for purchase. In response, the user may choose to initiate a purchase of the item from an item offering service, to add the item to a shopping cart of the user at the item offering service, or receive information regarding the item from the item offering service.

To do so, the user may send the request, via a remote control or otherwise, to a device, such as a set-top box, that monitors the video stream being displayed by the television. In response to receiving the request, the device may facilitate entry of an identifier of the user. The user may then enter an email address of the user, a mobile phone number of the user, a name of the user or any other information that allows the item offering service to uniquely identify the user.

After receiving the user's identifier, the device may send the identifier along with an identifier of the item to the item offering service to initiate the request, such as the request to purchase the item. In some instances discussed below, the device may also send a message authentication code (MAC) (e.g., a Hash-based MAC) or the like for the purpose of enabling the item offering service to verify the authenticity of the received message.

The item offering service may receive the user identifier, the item identifier and, potentially, the MAC. After verifying the authenticity of the message, the item offering service may map the received user identifier to a user account for the purpose of identifying the user. The service may also map the item identifier to an electronic catalog of items for the purpose of identifying the item, unless the device such as the set-top box has already done so.

After identifying the item, the service may analyze the user account to determine how the user prefers to approve purchases at the item offering service, as well as the contact information that the service may use to contact the user. For instance, the service may determine that the user prefers to receive an email in order to approve requested purchases. Conversely, the service may determine that the user prefers to receive short messaging service (SMS) or multimedia messaging service (MMS) text messages. In still other instances, the service may send a communication to the user based on the user identifier received. For example, the item offering service may send an email if the user provided an email address, may send an SMS text message if the user sent a mobile phone number, and the like.

In either instance, the service may send a request to approve the purchase of the item to a user. In some instances, the service sends this message to the user via a communication channel that differs from a communication channel by which the user entered the user identifiers and by which the item offering service received the user and item identifiers. For instance, the service may receive the user and item identifiers from the device that monitors the video stream via a private connection between the device and the service, while sending an email or an SMS text message to the user to approve the purchase.

In each of these instances, the user may receive a request to approve the purchase of the item from the item offering service. The user may then approve or deny the approval request and may provide this approval or denial back to the item offering service. Because the service sent this request via a communication channel that differs from how the user inputted the request to initiate the purchase, the user does not approve or deny the approval request via the television, but via another computing device. For instance, the user may send an approval to the item offering service via an SMS text message in instances where the service sent the approval request to the user via an SMS text message.

With use of these techniques, users are able to send requests to one or more item offering services to purchase items, add items to shopping carts, receive information about items, or the like, while watching a video stream on a computing device or a television (e.g., while watching broadcast television, a locally-stored movie, navigating an electronic program guide (EPG), playing a game, etc.), while listening to an audio stream on a radio or while consuming any other media stream by any other content output device. Furthermore, after sending the requests, the users are able to receive approval requests from the item offering service(s) via a mobile phone of the user, a laptop computing device of the user or any other electronic device other than the televisions through which the users inputted the initial requests. Furthermore, these users are able to receive the requested item or information via these other channels as well. For instance, a user may receive requested information about an item via an email after making the request for the information through the device coupled to the television.

In still other instances, a user may request to purchase an item identified in stream, such as a video stream, and provide, as a part of this request, both a user identifier and a personal identification number (PIN) or other password associated with the account of the user at the item offering service. Then, the device coupled to the content output device may send this request with the user identifier and the PIN to the item offering service, which may actually process the request on behalf of the identified user if the PIN matches a PIN stored by the item offering system in association with an account of the identified user. That is, the item offering service may approve the request to purchase an item in response to receiving a request from the device that is accompanied with a user identifier and a PIN that is associated with the user identifier at the item offering service.

Furthermore, because these techniques enable users to enter user identifiers before providing these identifiers to an item offering service, these techniques allow multiple different users to send requests through a common device and/or content output device. That is, if multiple users are watching a common video stream, each of these users is able to request to purchase or otherwise take an action regarding an item displayed on the television, for example, before consummating the transaction with the item offering service over communication channels that are unique to the individual users.

For instance, a first user may request to purchase a new pair shoes by entering a mobile phone number of the user into the device coupled to a content output device, such as a television. After receiving the identifier of the shoes and the email address of the user, the item offering service may then send an email to the entered address to allow the user to approve or deny the purchase. A second user, meanwhile, may see an advertisement for a particular book for sale and, in response, may request more information regarding the advertised book. The user may enter a mobile phone number of the user into the device coupled to the television and, after receiving the user and item identifiers, the item offering service may send an SMS or MMS text message to the entered mobile phone number containing additional information about the advertised book.

The discussion begins with a section entitled "Illustrative Architecture" that describes one example architecture and several example components that implement the techniques introduced above. Next, a section entitled "Illustrative User Interfaces" follows, describing examples of user interfaces (UIs) that may be served to and rendered at the television of the user of FIG. 1 after the user requests to purchase an item displayed on the television, add an item to a shopping cart of the user or request information regarding an item. The discussion then moves on to discuss an "Illustrative Flow Diagram" for implementing the described techniques in the architecture of FIG. 1, before concluding with a section entitled "Illustrative Processes" and a brief conclusion.

This brief introduction, including section titles and corresponding summaries, is provided for the reader's convenience and is not intended to limit the scope of the claims, nor the proceeding sections. Furthermore, the techniques described above and below may be implemented in a number of ways and in a number of contexts. Several example implementations and contexts are provided with reference to the following figures, as described below in more detail. However, the following implementations and contexts are but a few of many. For instance, and as discussed above, these techniques apply to a variety of content output devices and for a variety of media streams, including audio streams, video streams and any other form of media stream.

Illustrative Architecture

FIG. 1 illustrates an example architecture 100 in which a user 102 may leverage the techniques described above while consuming a stream being output by a content output device. Here, user 102 is viewing a video stream on a display 104 of a television 106. As illustrated, a content provider 108 provides the displayed video stream over a network 110, which may include any one or combination of multiple different types of networks, such as cable networks, the Internet, and wireless networks. In some instances, network 110 comprises a cable network, a satellite network or any other network that provides a television broadcast signal, an audio stream, video-on-demand or any other video or audio signal.

Content provider 108 may comprise a cable television provider, a satellite television provider or any other type of provider capable of providing a video stream to television 106. In some instances, a device 112 coupled to television 106 receives and causes display of the video stream on the television. In these and other instances, device 112 monitors the video stream to detect when items are shown on display 104, as introduced above and described in detail below. Although illustrated as separate from television 106, this device may also be integral with television 106 in other implementations. Furthermore, device 112 may comprise a set-top box, a game console, a media center or any other computing device that receives the video signal and causes display of the received signal on display 104 or any other device that otherwise monitors the incoming video stream.

FIG. 1 further illustrates that user 102 may use a remote control 114 or other input device to operate television 106 and/or device 112. For instance, user 102 may use remote control 114 to control contents of the displayed video stream (i.e., to change the channel), to control a volume of television 106, to adjust settings of television 106 or the like. Furthermore, remote control 114 may include controls that, when actuated by user 102, cause display of an overlay on display 104. This overlay may allow user 102 to request to purchase an item currently or previously displayed on display 104, may allow user 102 to request to add the item to a shopping cart or list (e.g., a wish list) associated with the user, may allow user 102 to request information regarding the item or may allow user 102 to take any other action regarding the item.

As introduced briefly above, device 112 receives these requests from user 102 and passes the requests to one or more offering services 116(1), 116(2), . . . , 116(M). In response to receiving these requests, the receiving offering services (e.g., service 116(M)) contacts user 102 for the purpose of fulfilling the request. FIG. 1 further illustrates that multiple other users 118 may also operate respective devices coupled to respective televisions for the purpose of making these requests to the same or different offering services 116(1)-(M).

FIG. 1, for instance, illustrates that display 104 currently displays an image of a digital camera. Device 112, which monitors the video stream displayed on display 104, detects that the digital camera may comprise an item offered for consumption (e.g., purchase, rental, lease, etc.) by one or more of offering services 116(1)-(M). The device may make such a determination by detecting an advertisement and determining the items being marketed therein, or the device may simply detect the item within the video stream, regardless of whether the item resides within an advertisement. In either event, device 112 detects that display 104 currently displays a particular identified item, namely a digital camera in this example.

Device 112 may implement one or more of a variety of techniques to identify the items within the audio and/or video stream. In the latter example, the device may implement image recognition technology to analyze the visually-displayed item and attempt to match the identified characteristics against a catalog of items. In addition or in the alternative, the device may request that a group of human users manually identify the items. For audio streams, the device may employ audio recognition techniques to identify item characteristics and compare these characteristics against the catalog of items. Again, the device may also request that a group of human users manually identify these items within the audio stream. However the device identifies the item, the techniques may employ a feedback loop to ask for user feedback regarding the identified item. By doing so, the device may continually improve its ability to correctly recognize items within a stream.

In response to identifying an item and in response to receiving a request from user 102 (e.g., via remote control 114), device 112 causes display of one or more icons on display 104 that enable user 102 to make specific request regarding the displayed item. For instance, FIG. 1 illustrates that device 112 may display an icon 120 entitled "Buy Now," an icon 122 entitled "Add to Cart," and an icon 124 entitled "More Info."

In addition or in the alternative, device 112 may compile each item identified within a particular program, movie, song or other stream. Then, device 112 may provide a list of the identified items to the user at the conclusion of the program for the user's browsing and perusal. For instance, the user may be able to receive information and/or request to purchase one or more items that were displayed within a particular episode of a television program, within a particular movie, or the like.

With this information displayed, user 102 may again operate remote control 114 (or any other control associated with device 112) to select one of icons 120, 122, and 124. For instance, when user 102 desires to purchase the illustrated digital camera, user 102 may select icon 120 to initiate a purchase of the camera from example offering service 116 (M). In response to selecting icon 120, device 112 may facilitate entry of an identifier associated with user 102 or another user. For instance, device 112 may display a text box that allows user 102 to enter (e.g., via remote control 114, via a keyboard, via a touch screen, audibly (via a microphone), etc.) a piece of information that uniquely identifies user 102 with offering service 116(M) and/or device 112. For instance, user 102 may enter his or her name, a mobile phone number of the user, an email address of the user, a user name of the user at offering service 116(M) or any other identifier.

In some instances, user 102 may enter a transaction phrase token as an identifier. As described in U.S. patent application Ser. No. 11/548,111 (incorporated by reference above), a transaction phrase token comprises a set of numeric or alphanumeric characters that may have a secondary meaning to the user (e.g., "Camera Wizard," "Grace's Textbooks," "Tanner's Allowance," "Rambling Trail Runner," etc.). Furthermore, in some instances, each of the phrases may comprise at least one word. In still other instances, each of the phrases may comprise between two and seven words, and may be free of numbers, symbols and the like. As such, these phrases may comprise a number of grammatically-correct words that may or may not be separated from one another by a space.

In some instances, a user may request creation of a transaction phrase token for the user's own use. That is, the user may link his or her payment instrument to a phrase token, such as "Camera Wizard," and may then use the transaction phrase token to purchase or otherwise consume services or items. In other instances, a first user may request creation of a token that is for use by a second user. For instance, a father may create a transaction phrase token for his son, Griffin, entitled "Griffin's Utility Bills." The father may then set rules about how Griffin may and may not use the transaction phrase token. For instance, the father could set a monthly allowance for the transaction phrase token or could specify that the token may only be used to pay for utility bills from specific vendors (and, hence, cannot be used to purchase other services or items).

In both instances, a user of a created transaction phrase token may use the phrase token to conduct transactions (e.g., to purchase or otherwise consume services or items offered for sale or consumption). For instance, the user could purchase, give, or receive a service or item (e.g., an item from a merchant, money, etc.) with the use of the transaction phrase token, or the user could similarly engage in any other sort of transaction with use of the token.

In some instances, a transaction phrase token that is associated with an aspect of a user account is free from information identifying the aspect of the user account. For instance, the transaction phrase token "Camera Wizard" may be associated with a payment instrument of user 102, yet may be free from information identifying the payment instrument. Therefore, the user associated with the phrase may more freely share the phrase than an actual identifier of the payment instrument. That is, user 102 may more freely share the phrase "Camera Wizard" when compared with the sharing of the underlying payment instrument (e.g., a credit card number, bank account number, gift card number, etc.).

In addition to being associated with one or more aspects of a user account (e.g., payment instrument, shipping address, etc.), a transaction phrase token may have other characteristics. For instance, a transaction phrase token may be assigned one or more rules specifying how the token may be used. For instance, user 102 may assign rules to his or her phrase token "Camera Wizard," specifying that offering service 116(M) is to automatically approve any purchase requests for digital camera items that are less than $100, and that these items are to be shipped via 2-day shipping. User 102 may similarly create any other similar or different rules.

Regardless of the identifier used, device 112 may send the user's entered identifier along with an identifier of the item (here, a digital camera) to offering service 116(M). In some instances, device 112 also sends a message authentication code (MAC) for the purpose of enabling offering service 116(M) to authenticate the message.

In response to receiving the message from device 112, offering service 116(M) may map the user identifier to a particular user and/or user account at the service. Service 116(M) may also map the item identifier to a particular item within an electronic catalog of items hosted by the service. The offering service 116(M) may also analyze the identified user account to determine a communication preference of the user. Conversely, the service may simply use the received user identifier to determine how to contact user 102 regarding the user's request to purchase the illustrated camera. In addition, offering service 116(M) may determine a payment instrument against which to charge the item, as well as a shipping address and ship speed that is to be associated with the order for the camera. Conversely, the service may instead request that user 102 specify this information in a communication to the user.

After determining some or all of this information, offering service 116(M) may then send a request to approve the purchase to user 102. In alternative instances, offering service 116(M) may automatically complete the purchase for the user if the user's account dictates. The service may then send a confirmation of the purchase rather than a request to approve the purchase. In each of these instances, service 116(M) may send an email, a short messaging service (SMS) text message, a multimedia messaging service (MMS) text message, an interactive voice response (IVR) communication, a phone call, a message to a web-accessible user account of user 102, or any other similar or different type of communication to user 102. In some instances, offering service 116(M) sends this message via a communication channel that differs from the communication channel by which user 102 inputted the information and by which device 112 sent the information to offering service 116(M). This approval request may simply include a request to approve or deny the purchase, or may also request additional information, such as a preferred payment instrument, shipping address and/or shipping method.

After receiving this approval request (e.g., via an SMS text message), user 102 may respond to offering service 116(M). In response to receiving an approval of the purchase, offering service 116(M) may proceed to finalize the purchase and fulfill the request for the digital camera. Conversely, the offering service may refrain from completing the purchase in response to receiving a denial of the purchase from user 102.

As discussed above, by allowing user 102 to enter a user identifier on an overlay of a video stream displayed on television 106, the user and other users are able to purchase items advertised or otherwise shown on broadcast television, movies or the like without having to first associate device 112 with an account of the user at offering service 116(M). That is, potentially any user who is watching the video stream on display 104 may request to purchase a displayed item. In addition, multiple users may each request to purchase same or different items from the same television and via common device 112. Furthermore, by separating the initiating of the transaction with the approval of the transaction, users are able to initiate a purchase while watching the video stream and finalize the purchase at a later time. In instances where these users have a business relationship with offering service 116 (M) (e.g., when the users maintain a user account at the service), the users do not have to provide payment details to a party that the users may or may not trust. Instead, these users are able to finalize this transaction with a party that already maintains trust of the users.

Figure 2:
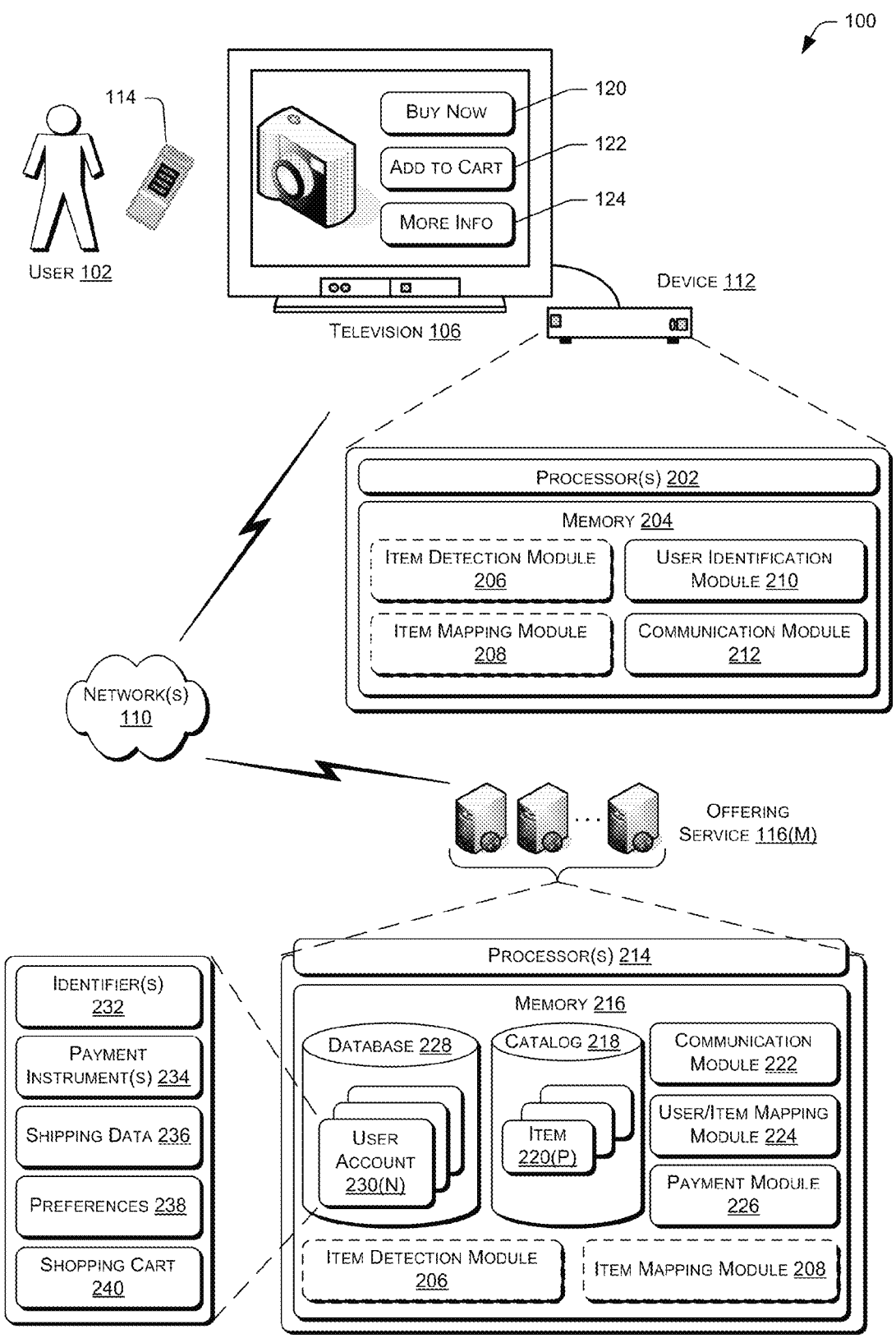
FIG. 2 illustrates example components of the device coupled to the television of FIG. 1, as well as example components of an item offering service of FIG. 1 that offers the item or information about the item displayed on the television.

FIG. 2 illustrates example components of device 112 coupled to television 106 of FIG. 1, as well as example components of item offering service 116(M) that offers the item or information about the item displayed on the television.

As illustrated, device 112 may include one or more processors 202 and memory 204. Memory 204 stores or otherwise has access to an item detection module 206, an item mapping module 208, a user identification module 210 and a communication module 212. Device 112 may include one or more other non-illustrated modules in some implementations.

Item detection module 206 serves to monitor the video stream being displayed on display 104 of television 106 for the purpose of identifying an item displayed within the stream. In some instances, module 206 monitors the stream to determine if the video stream displays an item that is included in one or more specified electronic catalogs, such as an electronic catalog hosted by offering service 116(M). Monitoring the stream may include both monitoring visual aspects of the displayed stream as well as metadata that accompany the video stream. In some instances, item detection module 206 identifies advertisements within the stream (e.g., video, audio, etc.) in order to identify one or more displayed items (e.g., with reference to tags in the metadata), while in other instances the module may identify items within the stream regardless of whether the item appears in a designated advertisement. As illustrated, item detection module 206 may reside on device 112 and/or on offering service 116(M).

In order to verify that a displayed object is indeed an item, item detection module 206 may communicate with item mapping module 208. Item mapping module 208 may receive candidate items from item detection module 206 and may attempt to map these items into one or more specified electronic catalogs for the purpose of verifying whether the object is indeed an item within the catalog, as well as the exact identity of the item. Once module 208 determines that an object is indeed an item, item mapping module 208 may determine an identifier associated with the item, such as a title of the item, a stock-keeping unit (SKU) of the item, a universal product code (UPC) of the item and the like. As illustrated, item mapping module 208 may reside on device 112 and/or on offering service 116(M).

In addition, item mapping module 208 may identify one or more accessory items that are related to the identified item for the purpose of offering these accessories to the user at a later time. Additionally or alternatively, module 208 may identify similar items that having higher reviews or additional functionality for later offering of these "up sell" items to the user.

Next, user identification module 210 enables user 102 (or any other user viewing the video stream on display 104) to enter an identifier associated with the user for the purpose of taking some action regarding a displayed item. For instance, when user 102 makes a request to initiate a purchase of the displayed digital camera, user identification module 210 facilitates entry of an identifier associated with the user. For instance, module 210 may present a text box to allow user 102 to enter his or her name, email address, mobile phone number, transaction phrase token, etc. Conversely, module 210 may enable user 102 to orally state an identifier or may enable user 102 to input such an identifier in any other similar or different manner.

Once device 112 has received a request from user 102, has identified the item associated with the request and has received an identification of user 102, communication module 212 may communicate this information to one or more of offering services 116(1)-(M). Specifically, communication module 212 may send a message that includes the determined item identifier, the entered user identifier and, potentially, a message authentication code (MAC) or the like that allows the receiving offering service(s) to validate the authenticity of the message.

In some instances, communication module 212 sends this message to a particular merchant that offers multiple different items regardless of the identity of the particular item. In other instances, communication module 212 uses the identity of the displayed item to determine which of the offering services 116(1)-(M) to which to send the message. For instance, in the illustrated example, module 212 may send the message to a manufacturer of the camera or to a merchant that is providing the advertisement. Similarly, communication module 212 may send the message to multiple different merchants that offer the item.

In the illustrated example, communication module 212 sends the message to offering service 116(M). As illustrated in FIG. 2, service 116(M) includes one or more processors 214 and memory 216, which stores or otherwise has access to an electronic catalog 218 that includes information about multiple items 220(1), 220(2), . . . , 220(P), such as the illustrated digital camera. An item can include a product, a service, a digital download, a news clip, customer-created content, information, or some other type of sellable or non-sellable unit. The stored information, meanwhile, may include item identifying information (e.g., SKUs, UPCs, titles, etc.), availability information, price information, rating information, or any other similar or different information.

Offering service 116(M) also stores or otherwise has access to a communication module 222, a user/item mapping module 224 and a payment module 226. Communication module 222 receives the message from the communication module of device 112 and also functions to contact user 102 in response to the receiving of the message, as described in detail below. To contact the user associated with the request, mapping module 224 maps the received user identifier to a database 228 that stores individual user accounts 230(1), 230(2), . . . , 230(N). As illustrated, example user account 230(N) stores one or more identifiers 232 of a user associated with the account, one or more payment instruments 234 associated with the user and the account, shipping data 236 associated with the user and the account and, potentially, preferences 238 associated with the user and the account. User account 230(N) may also store a shopping cart that includes items that are stored by the user for potential later purchase by the user.

Mapping module 224 may compare the received user identifier to identifiers 232 stored within user accounts 2301(1)-(N) in order to identify user 102 that sent the request via device 112. Next, mapping module 224 may consult preferences 238 of the user account of user 102 to determine how user 102 prefers to communicate with offering service 116(M). For instance, preferences 238 may dictate that communication module 222 should send an email to a particular email address of user 102 in response to receiving a request to initiate purchase of an item via device 112. In other instances, the received identifier of the user may dictate how communication module 222 communicates with user 102, with or without reference to preferences 238. For instance, if user 102 initially inputs a mobile phone number, then communication module 222 may communicate with the user via the received number.

Next, user/item mapping module 224 may map the received item identifier against electronic catalog 218 to identify the referenced item (here, the illustrated digital camera). After making this determination, the communication module 222 sends a message to identified user 102 regarding the identified digital camera and, potentially, regarding identified accessory and/or up sell items related to the identified digital camera. Here, because user 102 originally requested to initiate a purchase of the camera in the given example, this message comprises a request to approve purchase of the camera (for the determined cost of the camera) using one of payment instruments 234 and shipping data 236 (e.g., shipping address, shipping method and ship speed). This message is typically sent via a communication channel that differs from how user 102 originally input the request and from how device 112 sent the request to offering service 116(M). User 102 may then send an approval or a denial of the request to approve the purchase. In the former instances, offering service 116(M) may fulfill the request via payment module 226 by charging the specified payment instrument and delivering the item to user 102. In the latter instances, offering service 116(M) may cancel the transaction.

Figure 3:
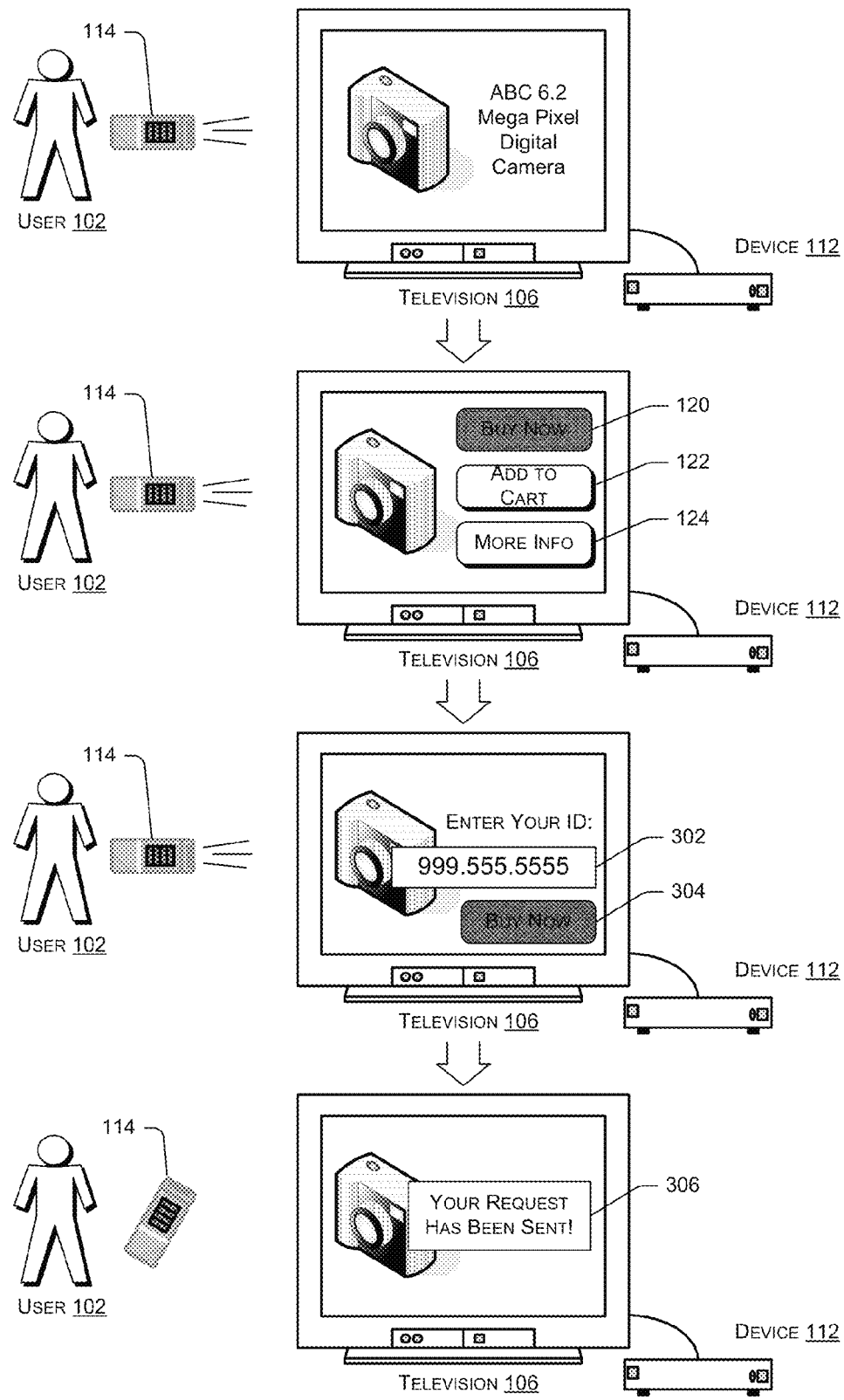
FIG. 3 illustrates a series of example user interfaces (UIs) that may be displayed on the television of FIG. 1 as the user requests to purchase an item displayed on the television.
Figure 4:
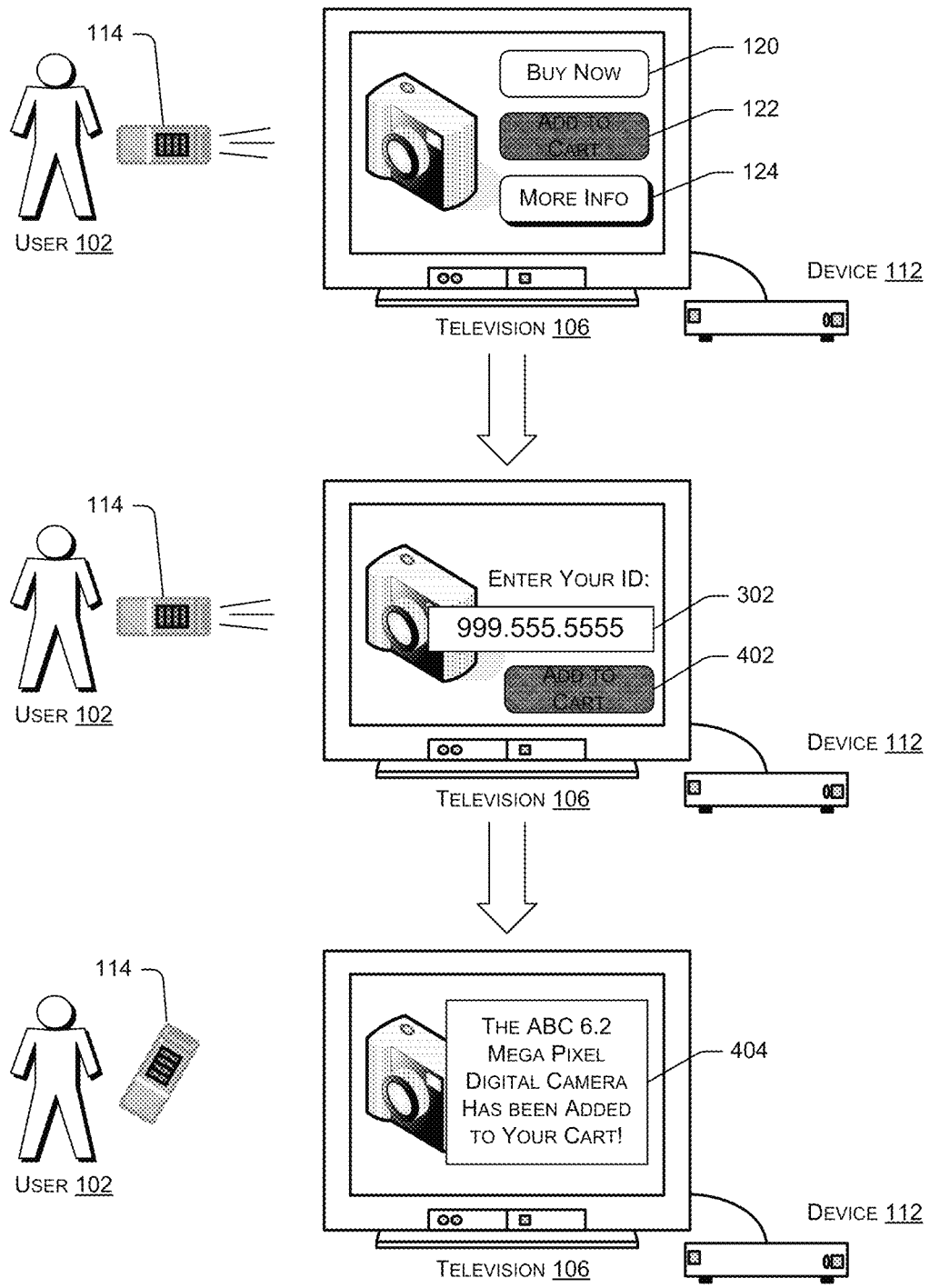
FIG. 4 illustrates a series of example user interfaces (UIs) that may be displayed on the television of FIG. 1 as the user requests to add an item displayed on the television to a shopping cart associated with the requesting user. In some instances, the item offering service of FIG. 1 maintains the shopping cart of the user.
Figure 5:
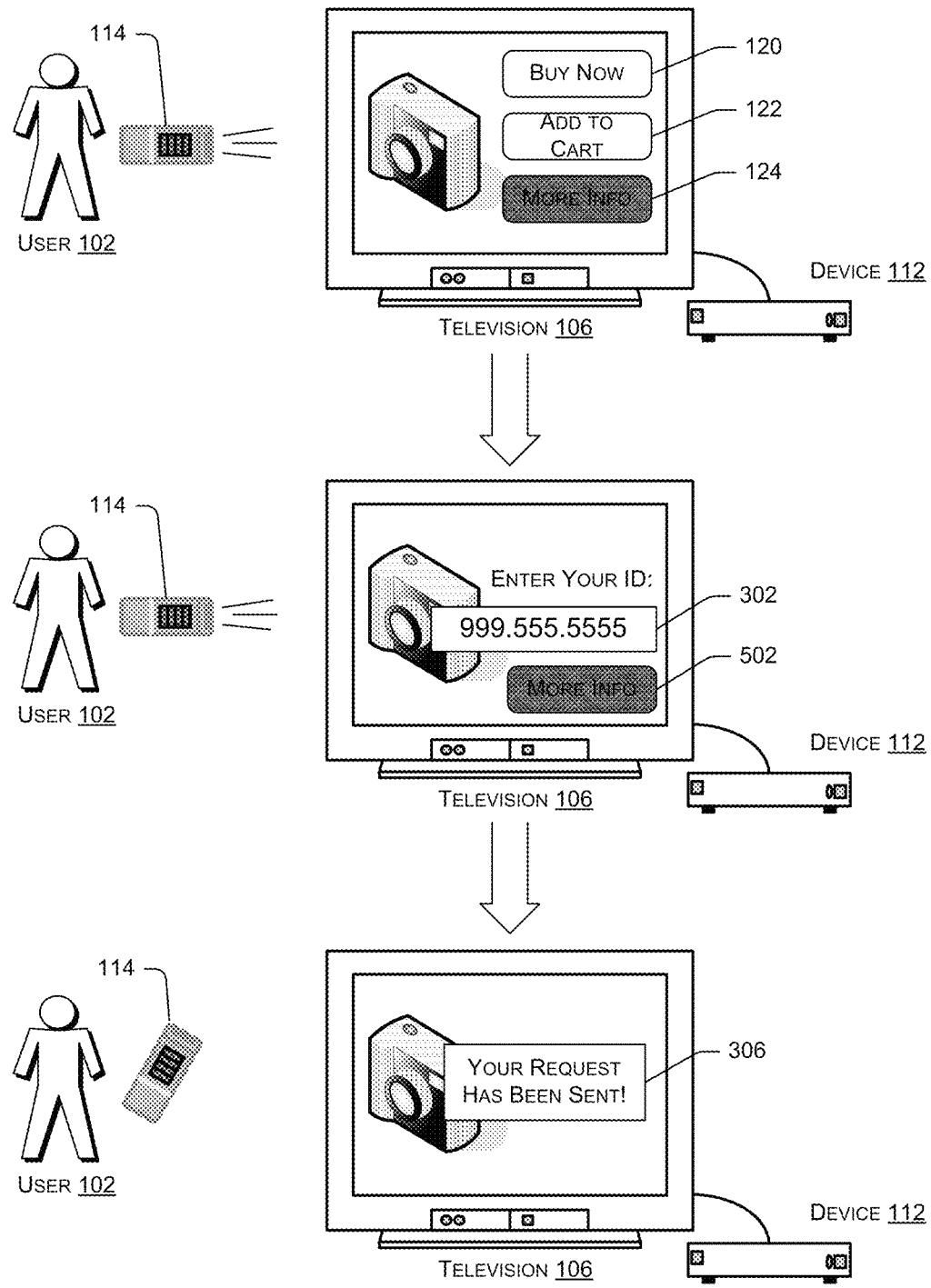
FIG. 5 illustrates a series of example user interfaces (UIs) that may be displayed on the television of FIG. 1 as the user requests information regarding an item displayed on the television.

While this example describes purchasing the illustrated item, user 102 may request to take other actions regarding the item. For instance, user 102 may request that offering service 116(M) add the illustrated digital camera to a shopping cart of the user. In response, offering service 116(M) may add the camera to shopping cart 240 and may send a message indicating as much to user 102. Alternatively, user 102 may request that offering service 116(M) provide additional information about the camera to user 102. In response, offering service may locate this information from electronic catalog 218 and may provide this additional information to user 102. FIGS. 3-5, discussed immediately below, illustrate example user interfaces that may be used with the techniques described above. While the proceeding section illustrates and describes example interfaces, it is noted that the claimed techniques may be implemented with use of many other similar or different interfaces or otherwise.

Illustrative User Interfaces

FIG. 3 illustrates a series of example user interfaces (UIs) that may be displayed on display 104 of television 106 of FIGS. 1 and 2 as user 102 requests to purchase an item displayed on the television.

FIG. 3 first illustrates that the video stream being displayed on television 106 may include an advertisement for the "ABC 6.2 Mega Pixel Digital Camera." In response to seeing this item on display 104, user 102 may request to purchase or otherwise take some action regarding this item. For instance, user 102 may actuate a button on remote control 114 that sends a request to device 112.

In response, device 112 may cause display of an overlay on display 104 of television. In this example, the overlay includes icons 120, 122 and 124 as discussed above. As illustrated, user 102 next selects icon 120 (entitled "Buy Now" in this example) and, in response, device 112 presents a new overlay that facilitates entry of an identifier associated with user 102 (or with another user if user 102 desires another user to purchase the item). As discussed above, user 102 may enter any sort of identifying information, such as the user's name, mobile phone number, email address, user account name at offering service 116(M), etc. In some instances, the device stores different options for the user to select from. For instance, the device may store the identifiers of users that have previously made requests via the device. The user is then able to, for example, select "1" for a first identified user, "2" for a second identified user and so forth.

As illustrated in FIG. 3, this example overlay includes a text box 302 and an icon 304 that, when selected, submits that request to initiate the purchase to the device, which passes this information on to offering service 116(M). Here, user 102 has entered a mobile phone number of user 102 into text box 302. While FIGS. 3-5 illustrate that user 102 enters his or her identifying information via text box 302, device 112 may facilitate entry of these identifiers audibly or via other techniques in other instances.

After user 102 enters the mobile phone number of the user and selects icon 304, device 112 causes display of an indication 306 that informs user 102 that the device has sent the request to offering service 116(M). At this point, offering service 116(M) may receive the request, identify the item and the user, and may contact the user via a different communication channel for the purpose of completing the transaction. For instance, the offering service 116 may send an SMS text message to the user's mobile phone number to allow user 102 to approve or deny purchase of the camera.

FIG. 4 illustrates a series of example user interfaces (UIs) that may be displayed on display 104 of television 106 of FIGS. 1 and 2 as the user requests to add an item displayed on the television to a shopping cart associated with the user. To do so, the user first makes a request (e.g., via remote control 114 or otherwise) to take some action regarding the illustrated camera, and then selects icon 122 ("Add to Cart"). In response, device 112 again allows user to enter an identifier of the user, before selecting an icon 402 to "Add [the item] to [the user's] Cart." Again, the device 112 then sends the request to offering service 116(M), which adds the identified camera to the shopping cart of the identified user. Device 112 then may display a confirmation message 404 to user 102, although it need not. In some instances, offering service 116(M) may also send a message to user 102 indicating that offering service 116(M) has indeed added the camera to the shopping cart of the user.

FIG. 5 illustrates a series of example user interfaces (UIs) that may be displayed on display 104 of television 106 of FIGS. 1 and 2 as user 102 requests information regarding an item displayed on the television. Here, the user selects to receive "more information" regarding the illustrated camera by selecting icon 124. In response, device 112 again allows user 102 to enter his or her identifying information before selecting an icon 502 to submit the request. Device 112 then sends the request to offering service 116(M), which then identifies the item and the user, before locating the requested information and sending a message with this information to user 102. For instance, in the illustrated example, offering service 116(M) may send information regarding the ABC Digital Camera via an email to an email address associated with user, via an SMS text message to the user's mobile phone number, or the like.

Illustrative Flow Diagram

Figure 6:
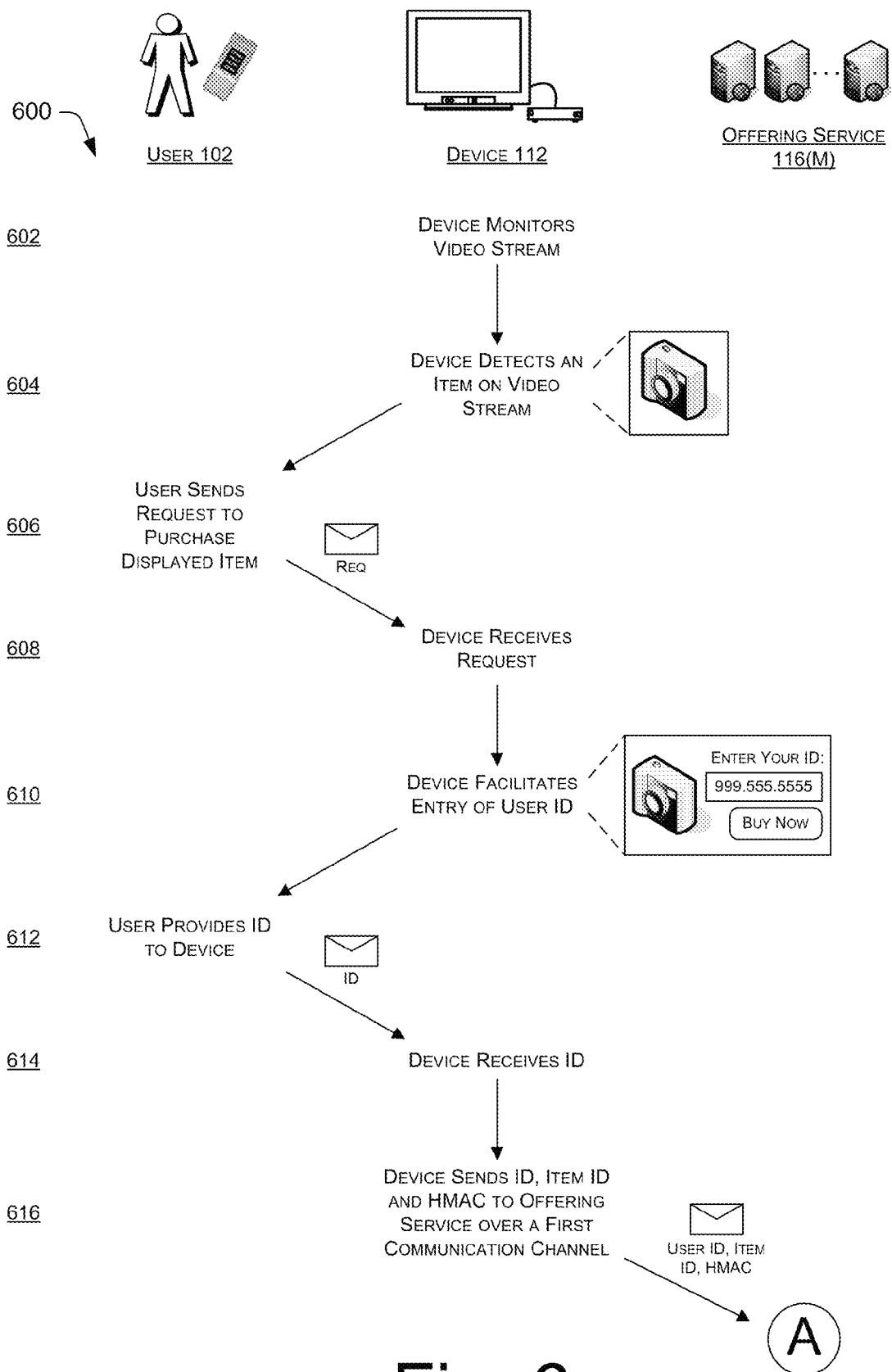
FIGS. 6-8 illustrate an example flow diagram of a process for fulfilling a user's request to purchase an item displayed on a television.
Figure 7:
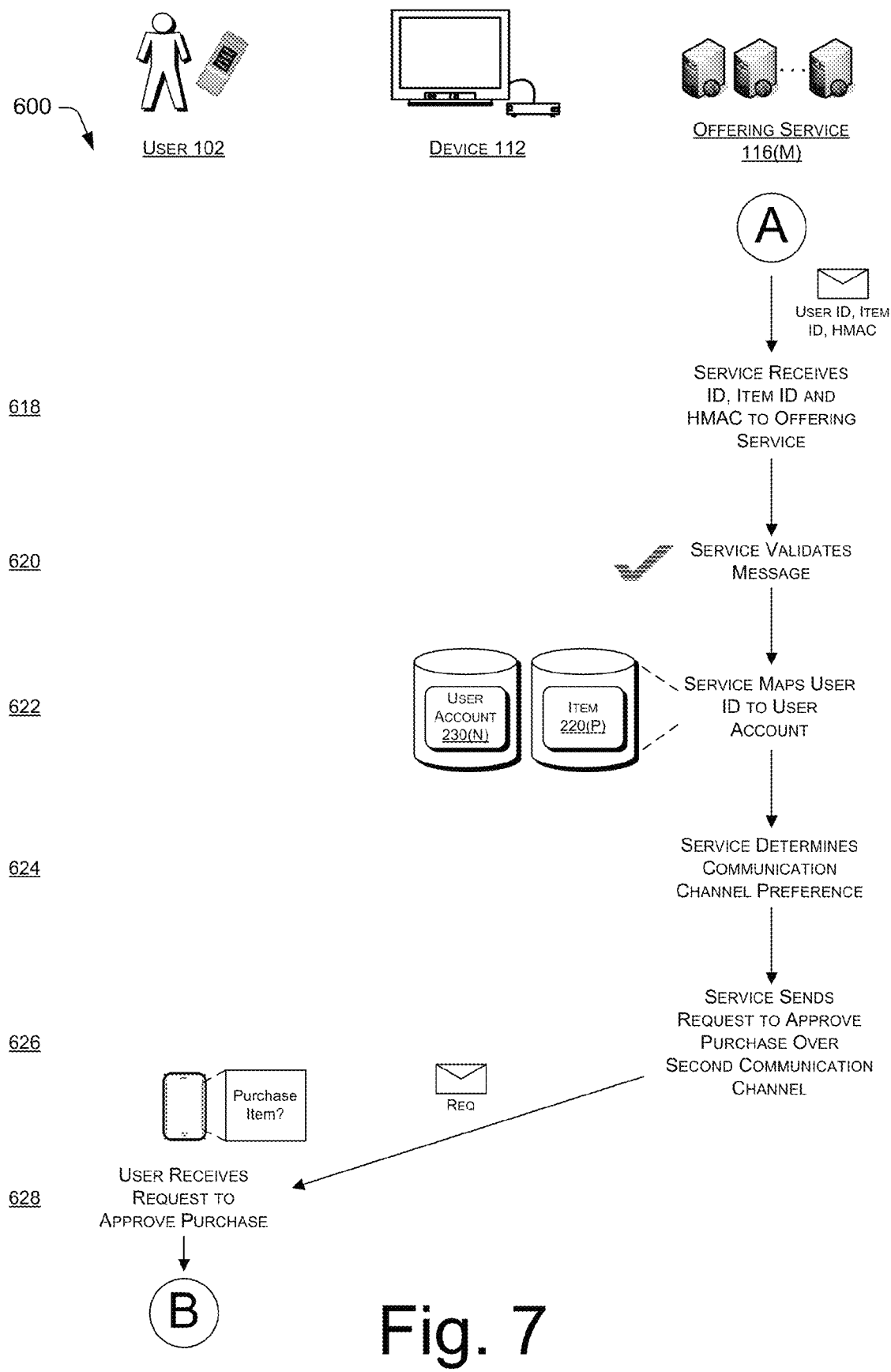
Figure 8:
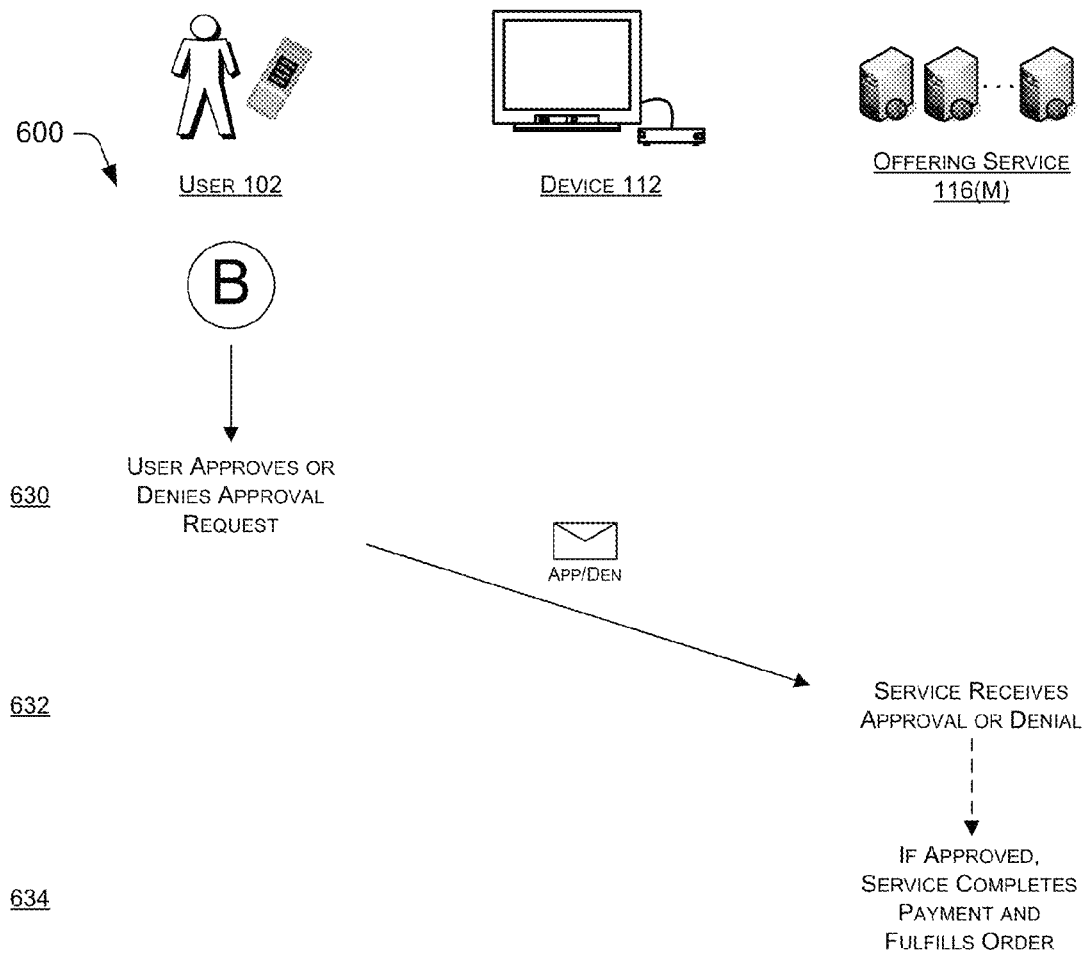

FIGS. 6-8 illustrate an example flow diagram of a process 600 for fulfilling a user's request to purchase an item displayed on a television. While this example describes user 102 purchasing an illustrated item, similar techniques may apply in instances where the user requests to add the item to a shopping cart of the user, to receive additional information regarding the item or take any other action regarding the displayed item.

Process 600 includes operation 602, at which device 112 monitors a video stream being displayed by a television. Again, device 112 may comprise a set-top box, a game console, an integral portion of the television or any other device capable of monitoring a displayed video stream to locate an item, as discussed above. At 604, device 112 detects an item on the video stream. Again, detecting an item may comprise detecting an item that appears within an electronic catalog of items maintained by one or more offering services. At 606, user 102 sends a request to device 112 to initiate purchase of the displayed item. In some instances, user 102 first sends the request, which then initiates the monitoring of the video stream and the detecting of the item by device 112.

In either instance, at 608, device 112 receives the request and, at 610, device 112 facilitates entry of a user identifier associated with user 102. For instance, device 112 may cause display of an overlay on the video stream that allows user 102 to provide identifying information. At 612, user 102 provides an identifier to device 112, which receives this information at 614. At 616, device 112 communicates the user identifier, the item identifier and, potentially, an HMAC or the like to an offering service over a first communication channel.

FIG. 7 continues the illustration of process 600. Here, offering service receives the user identifier, the item identifier and an HMAC at 618. At 620, offering service 116(M) validates the message with reference to the received HMAC. Next, at 622, offering service 116(M) maps the received user identifier to a unique user account within database 228 and maps the received item identifier to one or more unique items within electronic catalog 218. At 624, offering service 116(M) determines a communication channel preference of user 102 with reference to the identified user account of the user.

At 626, the offering service sends a request to approve the purchase of the item to user 102 over a preferred communication channel that differs from the communication channel by which the user initially made the request and that differs from the communication channel by which device 112 sent the request to service 116(M). For instance, offering service 116(M) may send the request via an SMS or MMS text message, via an email, via a message to a user account of the user at the offering service, via an IVR phone call or in any other manner. However, this approval request is not sent through device 112 and television 106 in some instances. At 628, the user receives the approval request.

FIG. 8 continues the illustration of process 600 and includes, at 630, user 102 approving or denying the approval request. At 632, offering service 116(M) receives the approval or denial and, in the former instances, completes payment for the item and fulfills the order at 634. For instance, the offering service may charge a payment instrument of user 102 and may initiate delivery of the item to the user with reference to a shipping address of the user and a preferred shipping method and speed of the user. As discussed above, the user account of user 102 at offering service 116(M) stores each of these pieces of information. In instances where the purchased item is a physical good, offering service 116(M) may initiate delivery of the item to a specified physical shipping address of the user. In instances where the purchased item is a digital good, meanwhile, offering service 116(M) may initiate delivery of the item to a specified digital location of the user.

Illustrative Processes

Figure 9:
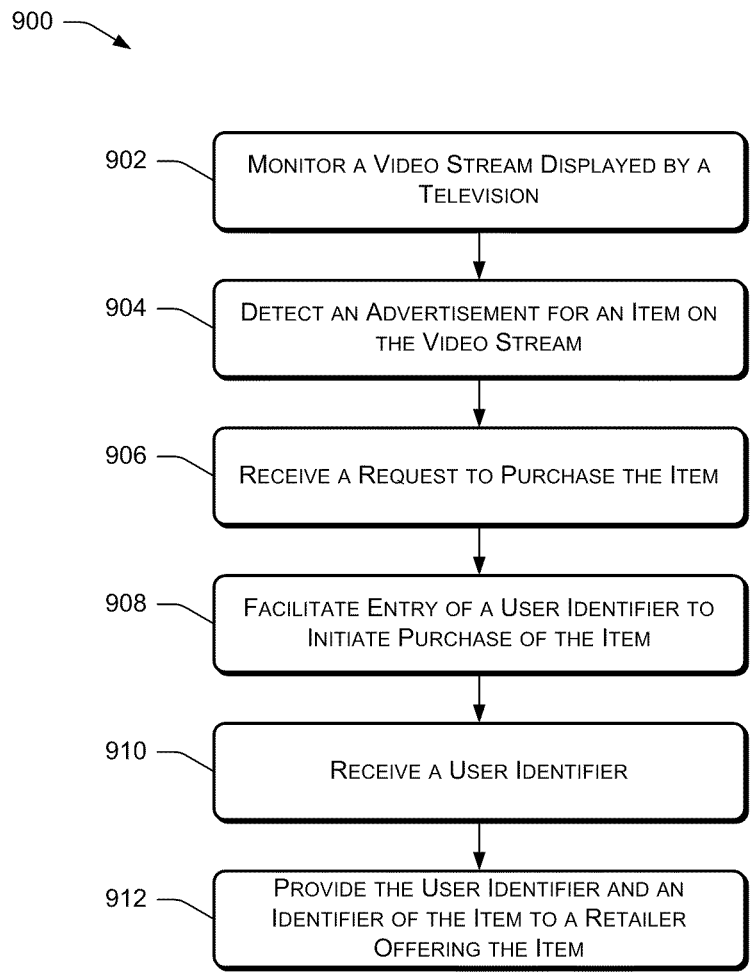
FIG. 9 illustrates an example process that the device of FIG. 1 may implement for enabling the user to request to initiate a purchase of an item displayed on the television of FIG. 1.
Figure 10:
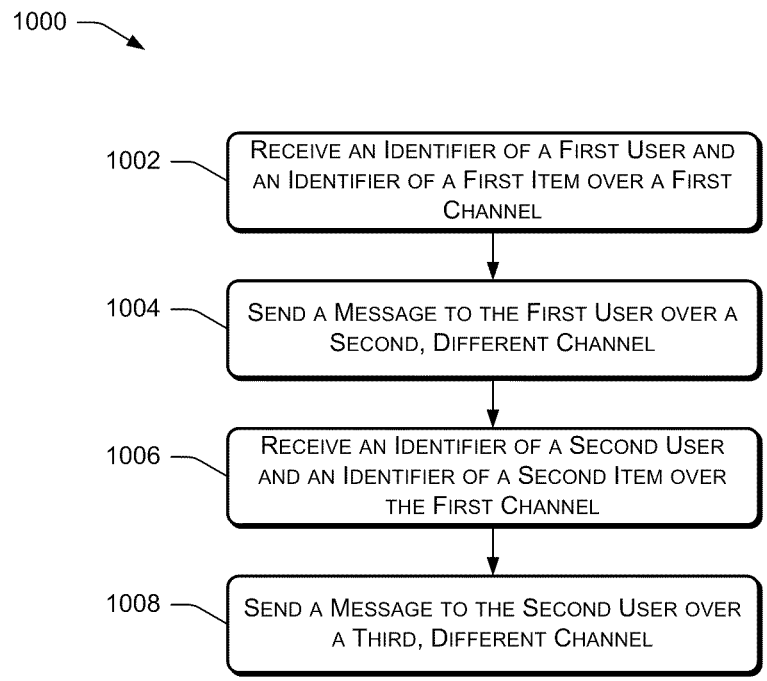
FIG. 10 illustrates an example process that an item offering service of FIG. 1 may implement in response to receiving multiple requests from multiple different users regarding items displayed on the television of FIG. 1.

FIGS. 9-10 illustrate example processes 900 and 1000 for implementing the techniques described above. While these processes are described with reference to the architectures discussed above, the described techniques may be equally applicable in many other architectures and environments. Furthermore, the described processes can be implemented in hardware, software, or a combination thereof. In the context of software, the illustrated operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

Device 112, coupled to television 106 of FIG. 1, may implement process 900 in some instances. Process 900 includes monitoring, at 902, a video stream being displayed by a television. At 904, device 112 detects an advertisement for an item on the displayed video stream. At 906, the device receives a request to purchase the item, possibly from user 102 as discussed above. In response, device 112 facilitates entry of an identifier of a user to initiate purchase of the item at 908. At 910, device 112 receives an identifier of a user, such as an email address, a mobile phone number, a user account name, etc. Finally, at 912, device 112 provides the user identifier and an identifier of the item to a retailer that offers the item for sale.

FIG. 10 illustrates process 1000, which offering service 116(M) of FIGS. 1 and 2 may implement in some instances. This process includes receiving, at 1002, an identifier of a first user and an identifier of a first item over a first communication channel from a device that is coupled to a television and that monitors a video stream being displayed by the television. For instance, offering service 116(M) may receive an identifier of user 102 and an identifier of the illustrated digital camera from device 112. Next, at 1004, offering service 116(M) sends a message to the first user regarding the first item over a second communication channel that differs from the first communication channel. For instance, offering service 116(M) may send such a message to the first user via a text message, an email, a message to a user account of the user or the like. This message may comprise a request to approve a purchase of the item, a notification that the item has been added to a shopping cart of the user, information regarding the item or the like.

At 1006, offering service 116(M) receives an identifier of a second user and an identifier of a second item over the first communication channel from the same device that is coupled to a television and that monitors a video stream being displayed by the television. Stated otherwise, the offering service may receive an identification of a different user via the same device coupled to the same television. For instance, two different users may request to initiate purchases of two different items while consuming the same video stream on the television.

At 1008, the offering service 116(M) sends a message to the second user regarding the second item over a third communication channel that differs from the first and second communication channels. For instance, this channel may comprise a communication channel that is unique to the second user, such as via a text message to a mobile phone of the second user, an email to an email address of the second user, and the like. Again, this message may comprise a request to approve a purchase of the item, a notification that the item has been added to a shopping cart of the user, information regarding the item or the like.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A system, comprising:
   at least one processor; and
   one or more memory devices to store instructions that, when executed by the at least one processor, cause a computing device to:
      receive, from a device over a first communication channel, an identifier of a first user and an identifier of a first item within a stream output by a content output device coupled to the device;
      send, over a second communication channel that is different than the first communication channel, a message to the first user regarding the first item;
      receive, from the device coupled to the content output device and over the first communication channel, an identifier of a second, different user and an identifier of a second item within the stream output by the content output device;
      generate a message to the second user regarding the second item; and
      send, over a third communication channel that is at least different than the first communication channel and independent of the device coupled to the content output device, the message to the second user regarding the second item.

2. The system as recited in claim 1, wherein the message sent to the first user comprises a request to approve a purchase of the first item identified in the stream being output by the content output device.

3. The system as recited in claim 2, wherein the one or more memory devices store instructions that, when executed, further cause the computing device to:
   receive, from the first user, an approval of the purchase of the first item; and
   at least partly in response to receiving the approval, complete the purchase and initiate fulfillment of the first item.

4. The system as recited in claim 1, wherein the message sent to the first user comprises information regarding the first item identified in the stream being output by the content output device.

5. The system as recited in claim 1, wherein the message sent to the first user comprises an indication that the first item has been added to a shopping cart associated with the first user.

6. The system as recited in claim 1, wherein to send the message to the first user over the second communication channel, the instructions, when executed by the at least one processor, further cause the computing device to send an email to the first user, send a short messaging service (SMS) text message to the first user, send a multimedia messaging service (MMS) text message to the first user, or send a message to an account associated with the first user and accessible to the first user over a public network.

7. The system as recited in claim 1, wherein the one or more memory devices store instructions that, when executed by the at least one processor, further cause the computing device to:
   at least partly in response to receiving the identifier of the first user:
      map the identifier of the first user to an account of the first user at an entity offering the first item; and
      determine a preference of the first user stored in the account of the first user at the entity;
      wherein the second communication channel used to send the message is identified based at least in part on the preference of the first user.

8. The system as recited in claim 1, wherein the one or more memory devices store instructions that, when executed by the at least one processor, further cause the computing device to:
   receive, from the device, a request message including the identifier of the first user;
   determine a type of request of the request message, wherein the request message includes a request from the first user to receive information regarding the first item, and wherein the request is free of payment information; and
   generate a response to the request message, the response including information regarding the first item, and the response based at least in part on the type of the request;
   send, to the first user over the second communication channel, the response to the request message.

9. The system as recited in claim 1, wherein the one or more memory devices store instructions that, when executed by the at least one processor, further cause the computing device to:
   determine a communication channel preference for the first user;
   wherein the third communication channel is based at least in part on the communication channel preference for the first user.

10. A method comprising:
    under control of one or more computer systems configured with executable instructions:
       receiving, from a device coupled to a content output device and over a first communication channel, an identifier of a first user and an identifier of a first item identified in a stream output by the content output device;
       sending, over a second communication channel that is different than the first communication channel, a message to the first user regarding the first item;
       receiving, from the device coupled to the content output device and over the first communication channel, an identifier of a second, different user and an identifier of a second item identified in the stream output by the content output device; and
       sending, over a third communication channel that is at least different than the first communication channel and independent of the device coupled to the content output device, a message to the second user regarding the second item.

11. The method as recited in claim 10, wherein the content output device comprises a personal computing device, a television or a radio.

12. The method as recited in claim 10, wherein the device coupled to the content output device monitors the stream being output by the content output device to identify the first and second items within the stream.

13. The method as recited in claim 10, wherein the stream comprises a video stream, wherein the device coupled to the content output device comprises a set-top box or a game console, and wherein the device receives the video stream and provides the video stream to the content output device for display.

14. The method as recited in claim 10, wherein the device coupled to the content output device is integral with the content output device.

15. The method as recited in claim 10, wherein the second communication channel is the same as the third communication channel.

16. The method as recited in claim 10, wherein the message sent to the first user comprises a request to approve a purchase of the first item identified in the stream being output by the content output device.

17. The method as recited in claim 16, further comprising:
    receiving, from the first user, an approval of the purchase of the first item; and
    at least partly in response to the receiving of the approval, completing the purchase and initiating fulfillment of the first item.

18. The method as recited in claim 10, wherein the message sent to the first user comprises information regarding the first item identified in the stream being output by the content output device.

19. The method as recited in claim 10, wherein the message sent to the first user comprises an indication that the first item has been added to a shopping cart associated with the first user.

20. The method as recited in claim 10, wherein the sending of the message to the first user over the second communication channel comprises sending an email to the first user, sending a short messaging service (SMS) text message to the first user, sending a multimedia messaging service (MMS) text message to the first user, or sending a message to an account associated with the first user and accessible to the first user over a public network.

21. The method as recited in claim 10, wherein an entity that offers the first item receives the identifier of the first user, and further comprising:
    at least partly in response to the receiving of the identifier of the first user:
       mapping the identifier of the first user to an account of the first user at the entity; and
       determining a preference of the first user stored in the account of the first user at the entity;
       and wherein the second communication channel used to send the message is identified based at least in part on the determined preference of the first user.

22. One or more non-transitory, computer-readable storage media storing instructions that, when executed, cause one or more processors to perform acts comprising:
    receiving, from a device coupled to a content output device and over a first communication channel, an identifier of a first user and an identifier of a first item within a stream output by the content output device;
    sending, over a second communication channel that is different than the first communication channel, a message to the first user regarding the first item;

receiving, from the device coupled to the content output device and over the first communication channel, an identifier of a second user and an identifier of a second item within the stream output by the content output device, wherein the second user is different than the first user;

generating a message to the second user regarding the second item; and sending, over a third communication channel that is at least different than the first communication channel and independent of the device coupled to the content output device, the message to the second user regarding the second item.

23. The one or more non-transitory, computer-readable storage media as recited in claim 22, wherein the instructions, when executed, cause the one or more processors to further perform acts comprising:

receiving, from the device, a request message including the identifier of the first user;

determining a type of request of the request message, wherein the request message includes a request from the first user to receive information regarding the item, and wherein the request is free of payment information;

sending, over the second communication channel, a response to the first user, wherein the response is based at least in part on the type of request.

24. The one or more non-transitory, computer-readable storage media as recited in claim 12, wherein the instructions, when executed, cause the one or more processors to further perform acts comprising:

determining a communication channel preference for the first user; and wherein the third communication channel is based at least in part on the communication channel preference for the first user.

25. The one or more non-transitory, computer-readable storage media as recited in claim 23, wherein the instructions, when executed, cause the one or more processors to further perform acts further comprising:

receiving, over a communication channel that is different from the first communication channel, a confirmation message that includes a confirmation of a request to purchase the item, wherein the request message includes the request to purchase the item.

26. The one or more non-transitory, computer-readable storage media as recited in claim 23, wherein the instructions, when executed, cause the one or more processors to further perform acts further comprising:

validating authenticity of the request message.

27. The one or more non-transitory, computer-readable storage media as recited in claim 23, wherein the response message includes an indication that the first item has been added to a shopping cart associated with the user.

28. The one or more non-transitory, computer-readable storage media as recited in claim 23, wherein the content output device comprises a personal computing device, a television or a radio.

* * * * *